W. L. HOLBROOK, DEC'D.
M. HOLBROOK, ADMINISTRATRIX.
WAFFLE MOLD.
APPLICATION FILED JAN. 22, 1920.
1,385,829.
Patented July 26, 1921.
2 SHEETS—SHEET 1.
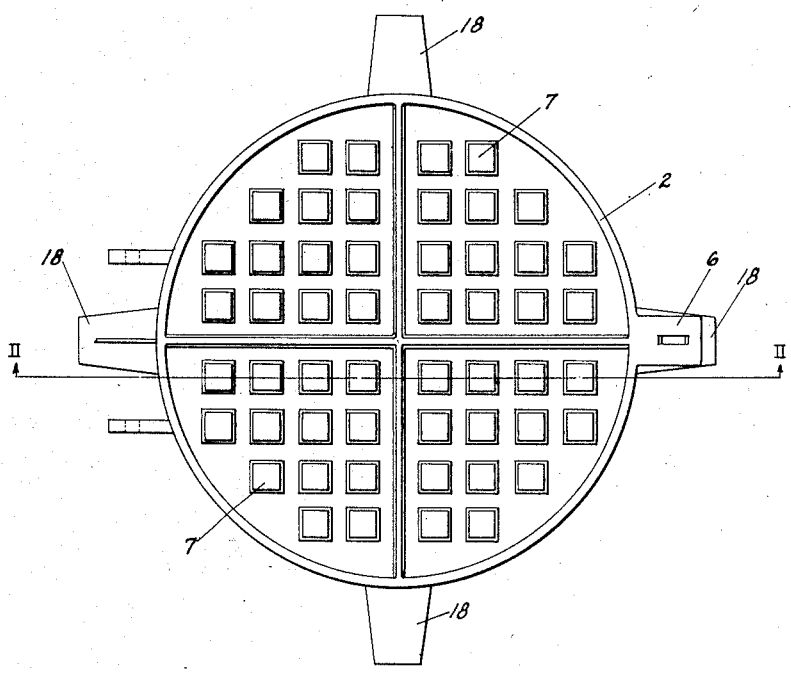
Fig. I
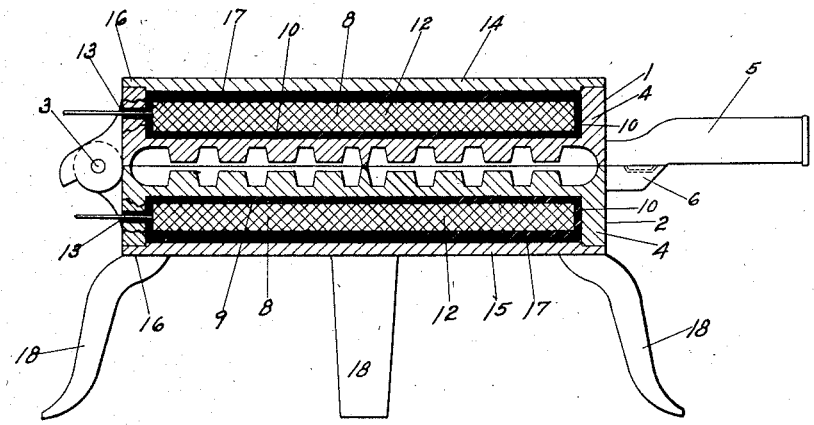
Fig. II
Inventor:
Willie L. Holbrook,
By
Joseph L. Atkins
Attorney.

W. L. HOLBROOK, DEC'D.
M. HOLBROOK, ADMINISTRATRIX.
WAFFLE MOLD.
APPLICATION FILED JAN. 22, 1920.
1,385,829.
Patented July 26, 1921.
2 SHEETS—SHEET 2.
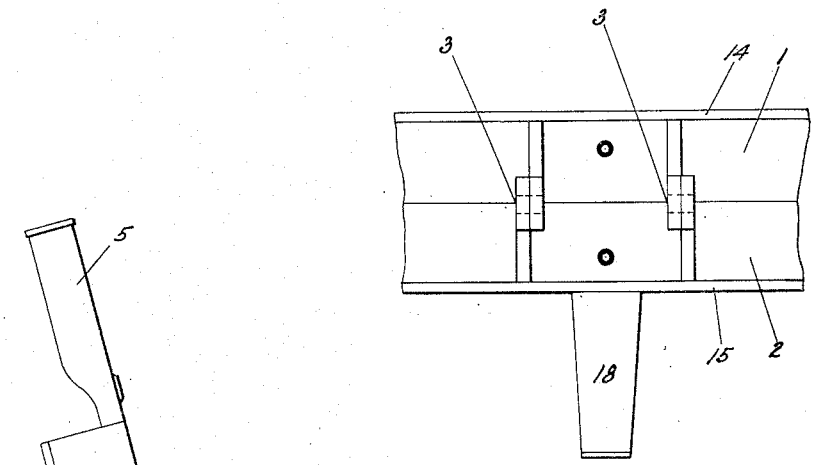
Fig. III
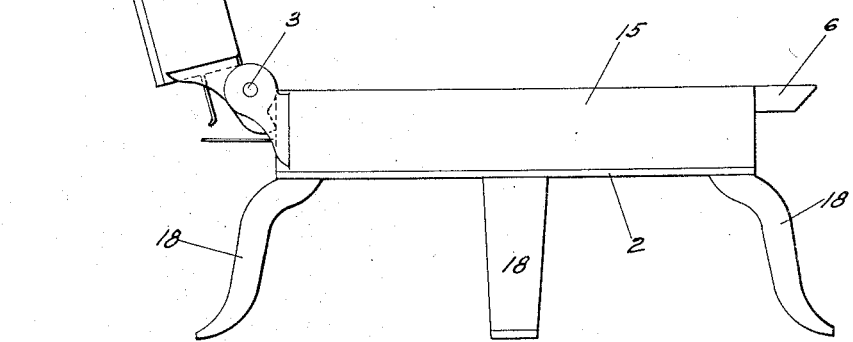
Fig. IV
Inventor:
Willie L. Holbrook,
By
Joseph F. Atkins,
Attorney.

UNITED STATES PATENT OFFICE.

WILLIE L. HOLBROOK, OF SEASIDE, OREGON; MARGARET HOLBROOK, ADMINISTRATRIX OF SAID WILLIE L. HOLBROOK, DECEASED, ASSIGNOR TO JOHN W. HENRY, OF PORTLAND, OREGON.

WAFFLE-MOLD.

1,385,829.      Specification of Letters Patent.      Patented July 26, 1921.

Application filed January 22, 1920. Serial No. 353,254.

*To all whom it may concern:*

Be it known that I, WILLIE L. HOLBROOK, a citizen of the United States of America, and resident of Seaside, in the county of Clatsop, in the State of Oregon, have invented certain new and useful Improvements in Waffle-Molds, of which the following is a specification, reference being had to the accompanying drawings.

My invention relates to improvements in waffle molds and has for its object the production of a practicable utensil of that kind that is adapted to be heated by electricity. The term "waffle iron" is the one commonly used to denote a utensil of the above description, but it is not strictly applicable to my device inasmuch as it is not confined to an article made of iron, but may be made of any metal suitable for the purpose.

In attempts hitherto made to cook waffles by electricity, an insuperable obstacle has been found in the difficulty of distributing the heat efficiently. If the electric heating elements be driven at a high temperature, the middle of the waffle, if of usual size, will burn before the edges thereof cook. On the other hand, if the heat of the element is kept down so as to avoid burning, the waffle will lack crispness throughout, and the edges, particularly, will be uncooked. Reduction of the size of the waffle, so as to minimize the mass and cooking effect of the batter to be cooked has been attempted as a remedy, but it is at best only a partial remedy, and one not generally or commercially acceptable.

By my invention, I provide means for cooking a waffle of any usual or preferred dimensions so that it will be well cooked and crisp throughout. I accomplish that end by providing upon each mold member of a two-part waffle iron, a massive circumferential, that is to say peripherical, wall, made integral with said mold-member, and whose mass is such and so disposed as to constitute an effective reservoir for the storage of heat. Said wall being located in juxtaposition to the outer edge of the member of which it forms a part and where it meets its companion member, its operative effect is there to direct and store the heat, and thereby to prevent a reduction of temperature that is, without some provision to prevent it, bound to occur between the mold-members, even when closed together.

By my invention, also, it is made practicable, in the construction of the utensil, to employ iron, (steel being carbonized iron) whose heating properties are recognized on certain accounts to be superior to any other metal for cooking waffles, and to employ that metal without the burning of the grease preferably used in cooking, which has heretofore constituted some objection generally to its use in the manufacture of waffle molds. The reason for that objection has been that the grease will catch fire from a flame or live coal. Electrically generated heat, though it avoids this difficulty, has been hitherto open to other objections that were of a more serious nature, but by my invention electric heat is now made practicable to effect the uniform cookery which perfection in the art demands.

Aluminum requires no grease, and has been used as a substitute for iron in the manufacture of waffle molds, but for some reason, probably on account of its inferior density, aluminum is found to "sweat" the surface of the waffle instead of imparting to it the crispness of finish which greased steel or iron gives to it. Iron, including steel, is, therefore, at present the metal I prefer to use for the manufacture of my utensil, but any suitable metal may be used.

What constitutes my invention will be hereinafter specified in detail and succinctly set forth in the appended claims.

In the accompanying drawings,

Figure I is a top plan view of a mold member of my device.

Fig. II is a vertical central section on the line II—II of Fig. I showing a side elevation of my waffle mold complete.

Fig. III is a fragmentary view of a portion of Fig. II showing the hinge connection between the two mold members thereof and the means of electrical connection therewith.

Fig. IV is a side elevation of the subject matter of Fig. II, showing the upper member raised.

Referring to the numerals on the drawings, 1 indicates the upper, and 2 the lower mold member of a two-part waffle mold, separably united and preferably hinged together as indicated at 3. The utensil as a whole and the mold members thereof may be of any desired shape and dimensions and may be either cast, pressed, or otherwise formed of any metal, preferably iron, including steel, as aforesaid. Upon each mold member, and integral with it, I provide a massive substantially vertical wall 4 in operative heating communication with its edges.

The member 1 is preferably, for convenience, provided with a handle 5, and the member 2 with an alining rest 6 for said handle.

Each mold member is provided with a molding and cooking face, such, for example, as is indicated by the numeral 7 shown in Fig. I. On the side of each mold member opposite its face 7, is a recess 8 whose outside defining wall is the wall 4. The walls of each recess 8 as above described are lined with thin insulations, as, for example, of mica, to wit, a horizontal disk 9, and a vertical annular strip 10. The thinness of the said insulations is designed to afford the requisite electric insulation with a minimum resistance to heat transmission. Within each insulated recess 8 is snugly fitted an electrical heating element 12, of any preferred description, adapted to be included in circuit with a source of electric energy, not illustrated, as by wires passing through apertures 13 in the wall 4. A cover provided for each recess 8 and preferably snugly fitted in the open end of the recess is fixedly attached to the wall 4 thereof as by aid of screws and a flange. The upper cover is indicated by the numeral 14 and the lower one by 15, the flange of each being indicated by the numeral 16. A space provided between the respective cover and the element within the recesses 8, respectively, is filled as with a thick asbestos plate 17. Each of the heavy plates 17 serves the double purpose of an insulator and of a retaining pad to hold the electric element, against which it is located, in a fixed position. As insulators, they not only confine the electricity, but also effectively direct the heat derived therefrom against the respective mold members and their walls 4 which are also the cooking members of the utensil. Legs 18 are illustrated as fixed to the member 2, as upon the cover 15 thereof, but any other suitable means of support may be used if preferred.

In operation, the members 1 and 2 are brought independently to the heat desired, through the energizing of their respective heating elements, the heat being preferably substantially equalized in the two. By this means it is made practicable to cook at one and the same time both sides of a waffle equally, while by the old method it was possible only to approximate a continuous and uninterrupted cooking of both sides of a waffle by frequently turning the mold and so presenting its opposite sides alternately to direct action of the heating medium, the top mold member, (the one more remote from the fire) being operative as such only by residual heat or the heat stored up in it during the period of its direct exposure to the fire. Moreover, through the employment of a circumferential wall 4, which is made massive and integral with each mold member for the storing up of heat, and by disposing it in operative proximity to the edges of the mold, the absence of the enveloping column of heat employed by the old method for heating the edges of the mold is compensated for. Consequently, the injurious cooling effect that would otherwise be caused by intrusion of air from without, or of expulsion of gases from within, between the juxtaposed edges of the closed mold members, may be effectively overcome.

What I claim is:

1. In a cooking utensil, the combination with a plurality of mold members in operatively separable relationship one to another, and each provided, in operative proximity to its outside edge, with an integral wall affording storage for heat and defining a recess on the outside of each mold member, of an electric heating element operatively incased within each of said recesses.

2. In a cooking utensil, the combination with two mold members in operatively separable relationship to each other, and each provided upon its outside, in operative proximity to its outer edge, with a recess-defining integral wall affording storage for heat, of an electric heating element operatively incased within each recess defined by said wall.

3. In a cooking utensil, the combination with a plurality of operatively separable mold members, each provided upon its outside in operative proximity to its outer edge, with a recess-defining wall as and for the purpose specified, of an electric heating element operatively incased within each recess defined by said wall, and means of insulation within each recess contrived and adapted to conserve and to direct the heat of the element against the said walls of each mold member for effectively heating the same.

4. As a new article of manufacture for the purpose specified, a mold member provided with a massive integral recess-defining circumferential wall disposed upon one side thereof to afford in itself storage heat.

In testimony whereof, I have hereunto set my hand in the presence of two subscribing witnesses.

WILLIE L. HOLBROOK.

Witnesses:
MARGUERITE HOLBROOK,
JOSEPH L. ATKINS.